Feb. 28, 1967  A. B. ELLIOTT, JR  3,307,098
INVERTER HAVING A SINGLE SELF-COMMUTATING THYRISTOR
Filed July 12, 1963
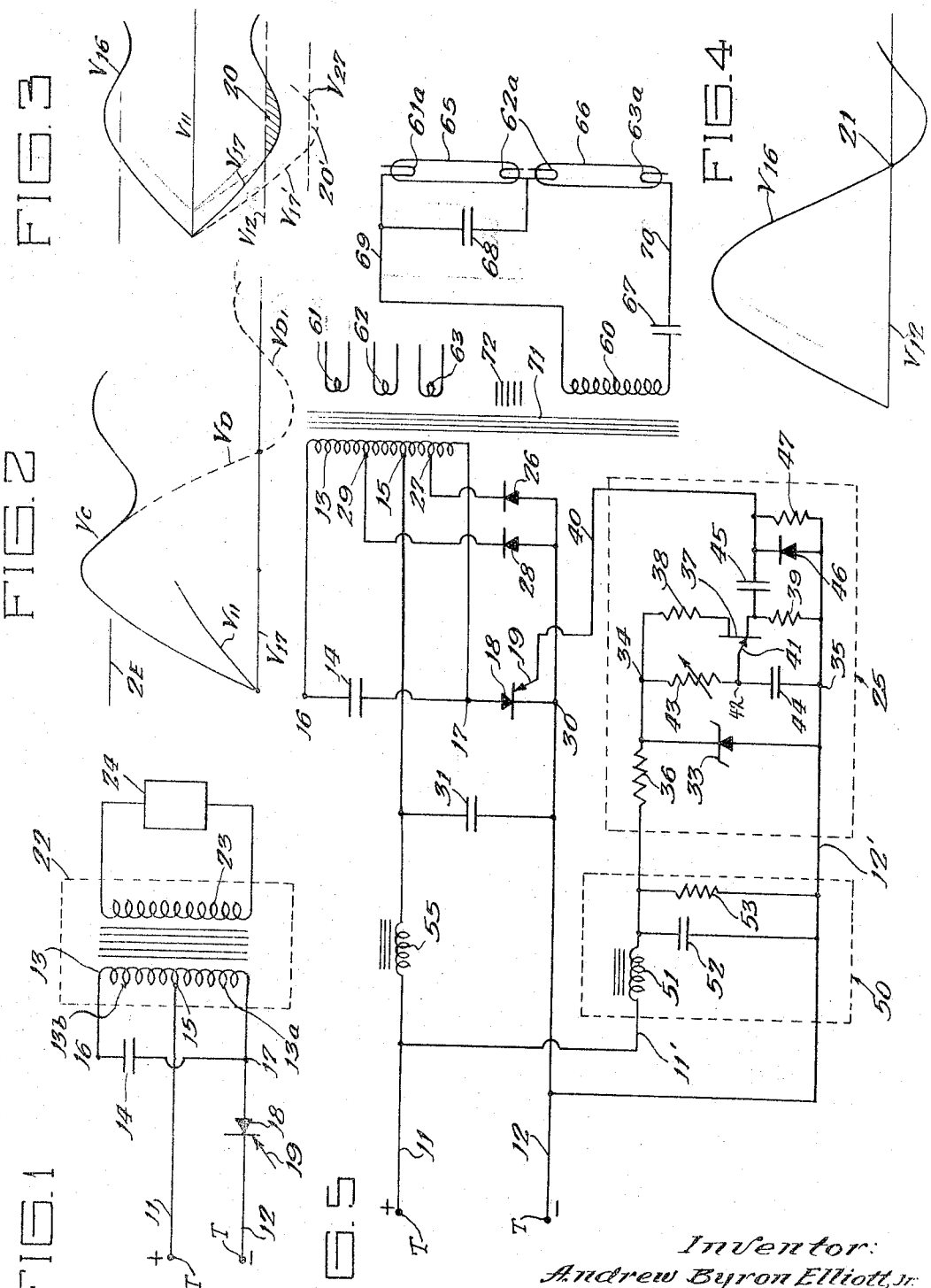
Inventor:
Andrew Byron Elliott, Jr.
By: Zahl, Baker, York,
Jones & Dithmar
Attorneys

United States Patent Office 3,307,098
Patented Feb. 28, 1967

3,307,098
INVERTER HAVING A SINGLE SELF-
COMMUTATING THYRISTOR
Andrew Byron Elliott, Jr., River Forest, Ill., assignor to
Jefferson Electric Company, Bellwood, Ill., a corporation of Delaware
Filed July 12, 1963, Ser. No. 294,580
5 Claims. (Cl. 321—44)

This invention relates to inverters for converting D.C. to A.C.

It is an object of my invention to provide an inverter embodying a transformer so that the A.C. output is an induced current, and which, at the same time, requires the use of only a single SCR. Thus a less costly construction is provided.

It has been found that the present invention operates satisfactorily under various load conditions, and is particularly suitable for powering fluorescent lamps.

Other objects, features and advantages of my invention will become apparent as the description proceeds.

With reference now to the drawings in which like reference numerals designate like parts:

FIG. 1 is a diagram illustrating the principles of my invention;

FIGS. 2, 3 and 4 are wave shape diagrams illustrating the operation; and

FIG. 5 is a circuit diagram showing a preferred embodiment of my invention.

FIG. 1 shows a D.C. supply line 11, 12, terminals T, an inductance winding 13, and a condenser 14. The positive lead 11 is connected to an intermediate tap, such as the midpoint 15, of the winding 13 dividing it into portions 13a and 13B. The condenser 14 is connected across the full winding 13 between point 16 and junction 17. An SCR (silicon controlled rectifier) 18 is interposed between the junction 17 and negative lead 12. When the line 11–12 is energized at E volts D.C., and a trigger pulse applied to the gate 19 of the SCR 18 to render it conducting, current will flow through winding part 13a inducing a voltage in part 13b so that the steady state voltage across the condenser, that is, across the points 16 and 17, would tend to be 2E.

The charging of the condenser 14 will be oscillatory as shown by the loops of the solid line curve Vc above and below the steady state voltage 2E in FIG. 2. Curve Vc represents the charging potential across condenser 14. The partial curve $V_{11}$ represents the potential of the midpoint 15 with respect to the junction 17.

In FIG. 3 the same magnitudes are plotted with respect to the potential $V_{11}$ of the positive lead 11. Since the midpoint 15 is tied to the positive line 11, at the time of the first loop in curve Vc (FIG. 2), the voltage at junction 17 will be negative with respect to the negative line 12, thus switching the SCR to the blocking state. The corresponding loop 20 in FIG. 3 is shaded to indicate the time interval during which the switch to blocking condition will occur.

Thus the steady state potential 2E is removed from the condenser with the result that it will discharge, the voltage Vd across the condenser during discharge being shown by the dotted line curve Vd in FIG. 2.

The discharge will also be oscillatory as represented by the loops in the dotted line curve Vd below and above the horizontal line $V_{17}$. FIG. 4 shows the charging and discharging curves Vc and Vd combined into a single curve $V_{16}$ which is plotted with respect to $V_{12}$. A second trigger pulse applied at the proper time will cause a repetition of the cycle of charge and discharge, with the result that a pulsating current is set up in the winding 13.

The winding 13 comprises the primary of a transformer 22 having a secondary winding 23 connected to a load 24. The pulsating current in winding 13 induces an alternating current in the secondary circuit 23–24. In FIG. 5, the corresponding parts have the same reference numerals. This figure additionally shows a trigger device 25 connected to the gate 19, a feedback diode 26 connected between a junction point 30 in the negative lead 12 and a tap 27 near the normally negative end of the winding 13, and a feedback diode 28 connected between the negative lead and a tap 29 in the normally positive portion of winding 13.

The magnitude of the loops in curve Vc of FIG. 2 will vary with the load conditions. For instance, under no load conditions they may be quite substantial with the result that the curve $V_{17}$ in FIG. 3 may have a shape as shown by $V_{17'}$ in FIG. 3. As a result, the reverse voltage across the SCR 18 may exceed the breakover point. The feedback diode 26 limits the magnitude of the reverse voltage depending upon the location of the tap 27. As shown in FIG. 3, the dotted line $V_{27}$ represents the manner in which the loop 20' may be cut off.

When a very rapid change in load impedance occurs, excessive overvoltages in the forward direction may be applied to the SCR. This is due to the fact that the discharge of the condenser 14 is accompanied by polarity reversal with the result that point 17 will be positive with respect to the negative line 12. This overvoltage is limited by proper location of the tap 29 to a value less than the forward breakover point of the SCR. The power for the feedback pulses through the diodes 26 and 28 is provided by the condenser 31. Thus, the feedback diode 28 protects the SCR 18 against excessive overvoltages in the forward direction.

The location of tap 15 can be varied according to circumstances; in the example shown it is at the one-third point.

The trigger device 25 may be any suitable trigger circut providing a pulse of sufficient magnitude and duration to turn on the SCR. An example of a suitable trigger device is shown in FIG. 5, which comprises a relaxation oscillator connected in parallel with a 30 volt zener diode 33 across points 34 and 35, 35 being connected to the negative lead 12', and 34 being connected to the positive lead 11' through a dropping resistor 36.

The relaxation oscillator includes a unijunction transistor 37 connected between points 34 and 35 through resistances 38 and 39 respectively. The base-one of the unijunction transistor 37 is connected to the gate 19 of the SCR 18 by a lead 40, and the emitter 41 is connected to a junction point 42 in an RC charging circuit, the latter comprising a variable series resistance 43 and a capacitor 44.

The capacitor 44 is charged at a rate determined by the series resistance 43. When the emitter breakover voltage is reached, the condenser 44 discharges through the resistance 39 which is connected between the base-one of the unijunction transistor 37 and the terminal 35. Thus a pulse is applied to the gate 19 which will be positive with respect to the cathode of the SCR, thus triggering the SCR into the conductive state.

A coupling capacitor 45 may be included in the gate lead 40, and connected between the gate lead 40 and negative lead 12' is a small diode 46 which prevents transmission of negative pulses, and a loading resistor 47.

In a practical embodiment of my invention, the inverter is designed to energize two fluorescent lamps 65 and 66, in FIG. 5. These are 96T12 rapid start fluorescent lamps having an 800 milliamp rating. The secondary circuit comprises a loosely coupled secondary winding 60 comprising 176 turns of No. 22 wire, heavy Isonel insulation. Closely coupled filament windings 61, 62 and 63 of one turn each are provided for filaments 61a, 62a and 63a respectively. The filament windings 61, 62 and 63 are of No. 19 wire Formvar insulated. The lamps 65 and 66 are connected in series with the secondary winding 60 by means of leads 69 and 70. A ballasting condenser 67 is connected in the aforesaid series circuit, being interposed in conductor 70, and a starting condenser 68 is connected in shunt around the lamp 65. The ballasting condenser 67 is 0.044 mfd. and the starting condenser 68 is 500 micro mfd.

For this particular load, it is desired to produce an A.C. output of several hundred volts r.m.s. at 9600 cycles frequency, the resistive load of the lamps being of substantially 210 watts, that is 105 watts apiece. As is well known in the ballasting art, the open circuit voltage across the terminals of the secondary winding part 60 is considerably greater than the r.m.s. voltage which appears across the terminals 61a, 63a, of the two series connected lamps 65 and 66 during operation.

The core 71 is a double E, shell type ferrite core, the cross section of the center leg being 1¼ inches by ⅞ inch. The particular material was Stackpole Ceramag No. 24A. The mean length of the core path is substantially 10 inches; the core has a through air gap of 0.030 inch. The primary and secondary windings 13 and 60 are spaced from each other to provide the desired leakage path, conventionally indicated at 72.

The primary winding 13 comprises 144 turns of stranded wire, the wire being formed of 19 strands of No. 31, Formvar insulation. The stranded wire is preferable due to the skin effect caused by the very rapid rate of increase of the pulse current. Tap 27 is made at the 28th turn from the normally negative end, tap 15 at the 48th turn, and tap 29 at the 88th turn.

The inverter was connected across a D.C. source of 148 volts. In this particular instance, the D.C. source was the output of a three-phase full wave bridge rectifier, which power source is characterized by a ripple. In order to filter out the ripple, a ripple filter 50 was inserted between the source and the trigger device 25. This ripple filter comprises a choke 51 of about 95 henries inserted in the positive lead 11', a 100 mfd. condenser 52 connected across the positive and negative leads 11' and 12', and a 330,000 ohm resistance 53 connected across the leads 11' and 12'.

A choke 55 of about 100 milli-henries is preferably inserted in the positive lead 11 which cooperates with the condenser 31 to cause the inverter to draw a relatively constant load current from the D.C. source. In addition, it serves as a filter with respect to any ripples in the source.

Other values, ratings, or catalog numbers of the various components of the practical embodiment shown in FIG. 5 are listed below:

Inverter:
    Condenser 14, 0.50 mfd.
    Condenser 31, 550 mfd.
    SCR 18, General Electric C40D
    Diode 26, General Electric A45C
    Diode 28, General Electric A45M
Trigger Device 25:
    Resistor 36, 6,000 ohms (5 watt rating)
    Resistor 38, 470 ohms (½ watt rating)
    Resistor 39, 330 ohms (½ watt rating)
    Resistor 43, 8,900 ohms (½ watt rating) (Variable between 39 and 3900 and 8900 ohms)
    Condenser 44, .022 mfd.
    Condenser 45, 0.10 mfd.
    Resistor 47, 300 ohms (½ watt rating)
    Unijunction 37, 2N1671A
    Zener 33, 1N3690A Although only a preferred embodiment of my invention has been shown and described herein, it will be understood that various modifications and changes may be made in the construction shown without departing from the spirit of my invention, as pointed out in the appended claims.

I claim:
1. An inverter comprising a transformer having a primary winding and a secondary winding, said primary winding having a first end, a second end, and an intermediate tap, a positive D.C. lead connected to said intermediate tap, a negative D.C. lead connected to said first end, said positive and negative leads having terminals for connection to a D.C. source, an SCR interposed in said negative lead between said negative terminal and said first end, a junction point located in said negative lead between said SCR and said first end, a condenser connected across said primary winding between said junction point and said second end, said second end being connected to said negative terminal only through said condenser and said SCR, and a trigger device connected to the gate of said SCR whereby a series of pulses applied by said trigger device to said gate will cause a pulsating current to traverse said primary winding and will induce an alternating current in said secondary winding.

2. An inverter comprising a transformer having a primary winding and a secondary winding, said primary winding having a first end, a second end, and an intermediate tap, a positive D.C. lead connected to said intermediate tap, a negative D.C. lead connected to said first end, said positive and negative leads having terminals for connection to a D.C. source, an SCR interposed in said negative lead between said negative terminal and said first end, a junction point located in said negative lead between said SCR and said first end, a condenser connected across said primary winding between said junction point and said second end, a trigger device connected to the gate of said SCR whereby a series of pulses applied by said trigger device to said gate will cause a pulsating current to traverse said primary winding and will induce an alternating current in said secondary winding, a second tap in said primary winding located between said first end and said intermediate tap, a second junction point located in said negative lead between said negative terminal and said SCR, and a feedback diode connected between said second junction point and said second tap.

3. An inverter comprising a transformer having a primary winding and a secondary winding, said primary winding having a first end, a second end, and an intermediate tap, a positive D.C. lead connected to said intermediate tap, a negative D.C. lead connected to said first end, said positive and negative leads having terminals for connection to a D.C. source, an SCR interposed in said negative lead between said negative terminal and said first end, a junction point located in said negative lead between said SCR and said first end, a condenser connected across said primary winding between said junction point and said second end, a trigger device connected to the gate of said SCR whereby a series of pulses applied by said trigger device to said gate will cause a pulsating current to traverse said primary winding and will induce an alternating current in said secondary winding, an auxiliary tap in said primary winding located between said second end and said intermediate tap, a feedback diode connected between said auxiliary tap and a point in said negative lead located between said negative terminal and said SCR, and a condenser connected across said positive and negative leads.

4. An inverter comprising a transformer having a primary winding and a secondary winding, said primary winding having, in order, a first end, a first tap, a second tap, a third tap and a second end, a positive D.C. lead connected to said second tap, a negative D.C. lead connected to said first end, said positive and negative leads having terminals for connection to a D.C. source, an SCR interposed in said negative lead between said negative terminal and said first end, a first junction point located in said negative lead between said SCR and said first end, a condenser connected across said primary winding between said first junction point and said second end, a trigger device connected to the gate of said SCR, a second junction point located in said negative lead between said negative terminal and said SCR, a first feedback diode connected between said second junction point and said first tap, a second feedback diode connected between said second junction point and said third tap, and a condenser connected across said positive and negative leads.

5. An inverter as claimed in claim 4 which includes an inductance in said positive D.C. lead located between said second tap and said positive terminal.

References Cited by the Examiner

UNITED STATES PATENTS

| | | | |
|---|---|---|---|
| 2,494,046 | 1/1950 | Klemperer | 321—35 X |
| 2,693,535 | 11/1954 | White | 321—36 X |
| 3,229,226 | 1/1966 | Wilting | 321—45 X |
| 3,241,039 | 3/1966 | Wilting | 321—45 X |

FOREIGN PATENTS 1,314,636  12/1962  France.

JOHN F. COUCH, *Primary Examiner.*

W. M. SHOOP, *Assistant Examiner.*